United States Patent [19]

Arbizzani

[11] Patent Number: 4,831,848
[45] Date of Patent: May 23, 1989

[54] PROGRAMMING AND CONTROL PANEL FOR DRY-CLEANING MACHINES

[75] Inventor: Tommaso Arbizzani, Pontecchio Marconi, Italy

[73] Assignee: Sodibo S.p.A., Bologna, Italy

[21] Appl. No.: 101,356

[22] Filed: Sep. 25, 1987

[30] Foreign Application Priority Data

Sep. 30, 1986 [IT] Italy ................................ 5008/86[U]

[51] Int. Cl.⁴ .............................................. D06F 33/02
[52] U.S. Cl. .................................... 68/12 R; 340/525; 340/286 M; 340/309.5
[58] Field of Search .......... 68/12 R; 340/525, 286 M, 340/309.5

[56] References Cited

U.S. PATENT DOCUMENTS

| 4,104,542 | 8/1978 | Karklys et al. | 68/12 R X |
| 4,195,500 | 4/1980 | Tobita et al. | 68/12 R |
| 4,510,778 | 4/1985 | Cotton | 68/12 R |
| 4,603,538 | 5/1987 | Cotton et al. | 68/12 R X |
| 4,676,077 | 6/1987 | Hirooka et al. | 68/12 R |

FOREIGN PATENT DOCUMENTS

| 2834351 | 2/1980 | Fed. Rep. of Germany | 68/12 R |
| 54-11564 | 3/1979 | Japan | 68/12 R |
| 60-135090 | 7/1985 | Japan | 68/12 R |
| 61-29391 | 2/1986 | Japan | 68/12 R |
| 61-21118 | 5/1986 | Japan | 68/12 R |
| 2112554 | 7/1983 | United Kingdom | 68/12 R |

Primary Examiner—Frankie L. Stinson
Attorney, Agent, or Firm—Guido Modiano; Albert Josif

[57] ABSTRACT

Programming and control panel for dry-cleaning machines comprising: a schematic illustration of elements of a dry-cleaning machine marked by first warning lights adapted to indicate alarm or operative conditions, second warning lights corresponding to various steps of a washing cycle, a digital display cooperating with third warning lights to visualize selected adjustments and operative conditions of the washing cycle, a plurality of buttons by means of which it is possible to vary the adjustments and operative conditions of the washing cycle.

1 Claim, 2 Drawing Sheets

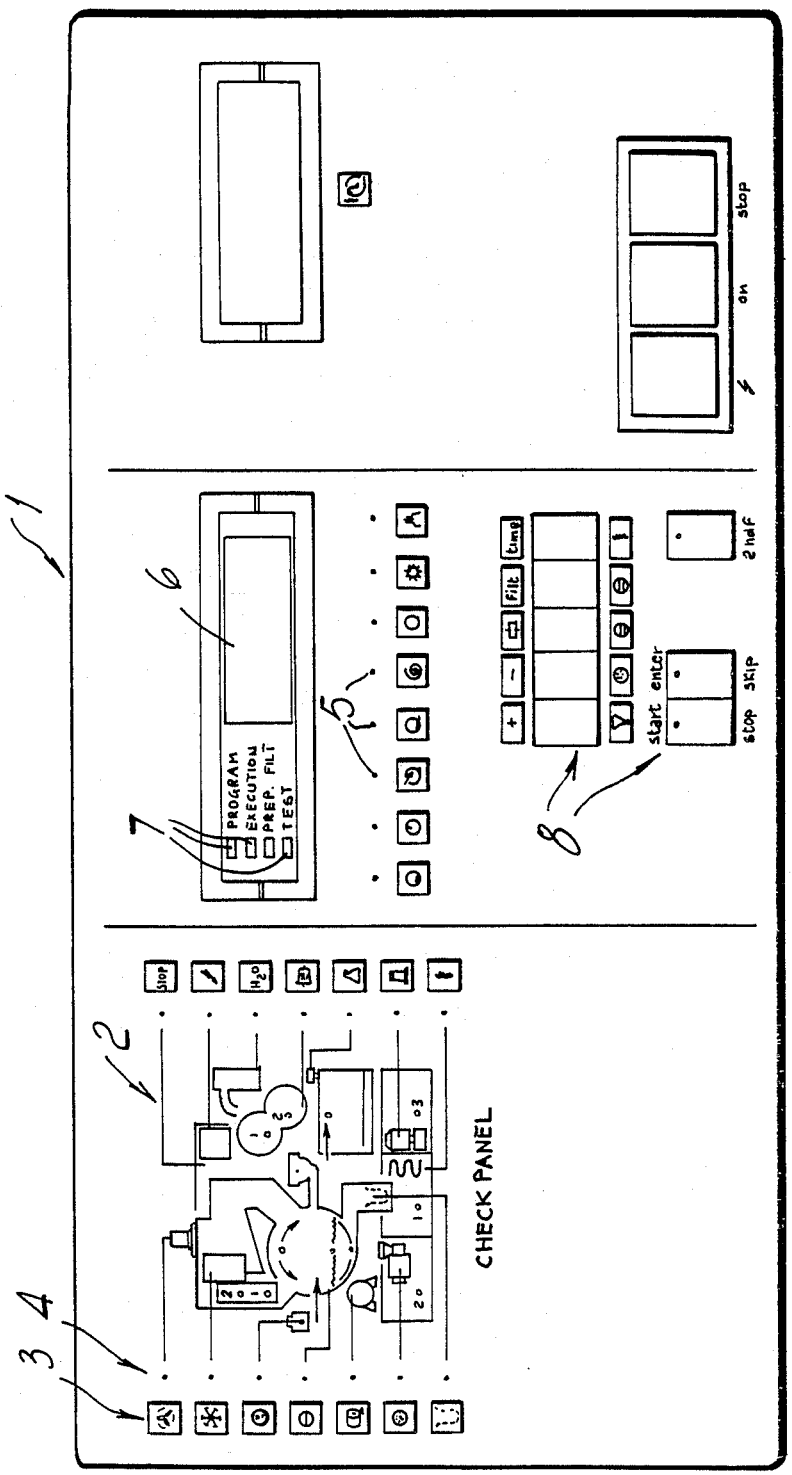

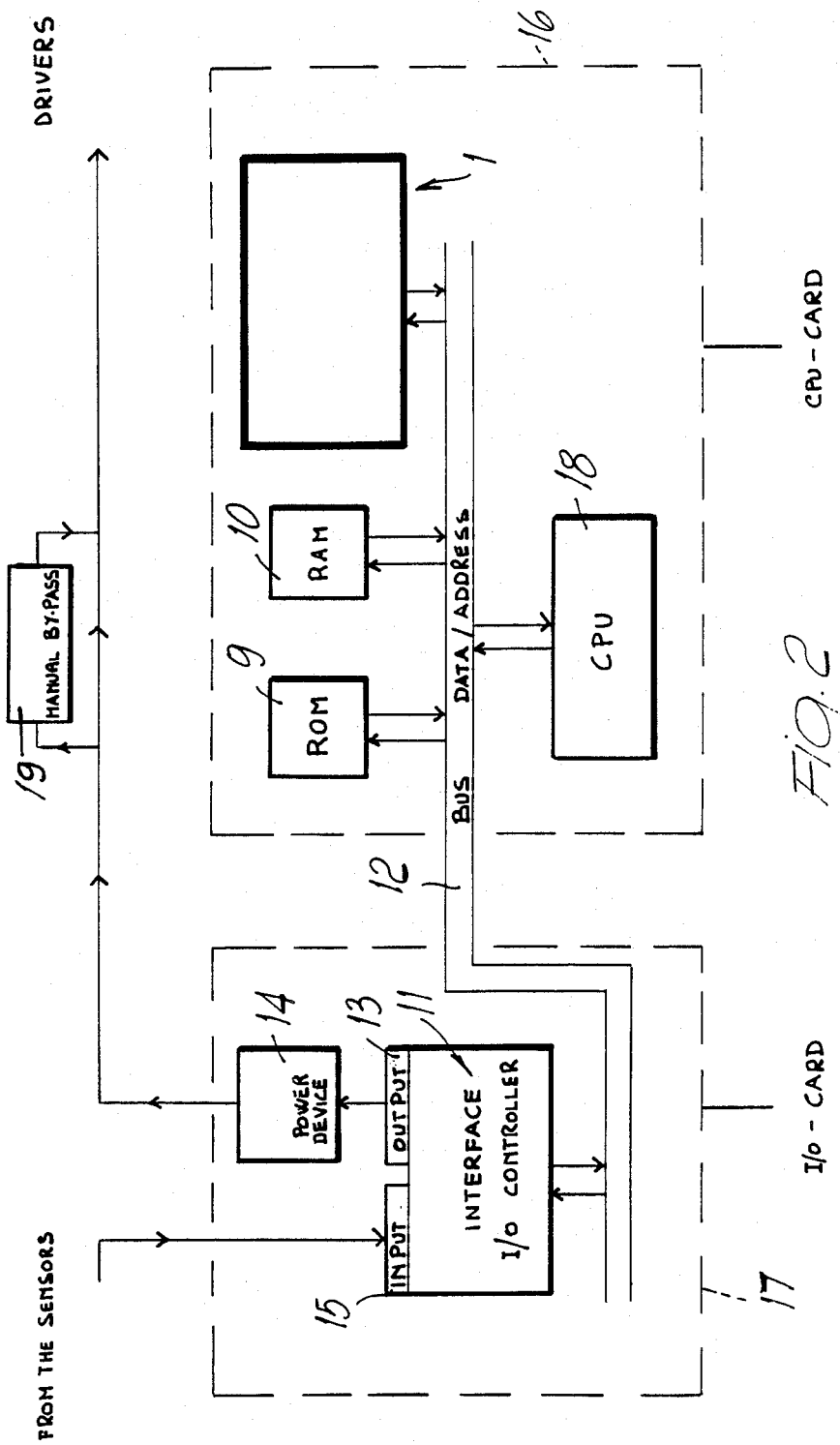

PROGRAMMING AND CONTROL PANEL FOR DRY-CLEANING MACHINES

BACKGROUND OF THE INVENTION

The present invention relates to a programming and control panel for dry-cleaning machines.

The known programming and control panel for dry-cleaning machines allow very limited interventions for modifying the washing cycles: in practice, in order to vary some parameters of the washing cycle it is necessary to act on the machine's sequence programming assembly, which requires a considerable expenditure of time and an exhaustive knowledge of the washing cycles.

In fact, for the programming of known dry-cleaning machines it is assumed that the operator knows exactly which assemblies of the machine are successively actuated at each step of the cycle and therefore sets the duration and the operating sequence of the various components (opening and closing of valves, tanks, pumps, fans, aspirators, compressors etc.).

Due to the considerable time and competence required, such interventions are performed only very rarely and therefore the washes are performed according to standard cycles.

SUMMARY OF THE INVENTION

The technical aim of the present invention is to eliminate the above described disadvantages, by providing a panel which displays the modifiable parameters, in an intuitive manner, i.e, in terms of cycle or washing step, and which simultaneously visualizes the components operating during that cycle or step.

Within the scope of this technical aim, an object of the present invention is to achieve the above described aim with a simple panel which is easy to manufacture, safe in use and effective in operation.

This aim and this object are achieved by a programming and control panel for dry-cleaning machines, characterized in that it comprises a schematic illustration of operative elements of a dry-cleaning machine marked by first warning lights adapted to indicate alarm and operation conditions of said operative elements, said panel further comprising second warning lights corresponding to various steps of a washing cycle of said dry-cleaning machine, a digital display cooperating with third warning lights to visualize selected adjustments and operative conditions of said washing cycle, a plurality of buttons being also provided on said panel to vary said operative conditions of said washing cycle.

BRIEF DESCRIPTION OF THE DRAWINGS

Further characteristics will become apparent and evident from the detailed description of a preferred, but not exclusive, embodiment of a panel according to the invention, illustrated only by way of non-limitative example in the accompanying drawing, wherein:

FIG. 1 is a view of the programming and control panel for dry-cleaning machines according to the invention;

FIG. 2 is a schematic block diagram of the connection between the panel and a dry-cleaning machine.

DESCRIPTION OF THE PREFERRED EMBODIMENTS

With particular reference to said figures, the programming and control panel for dry-cleaning machines according to the invention is generally indicated by the reference numeral 1.

The panel 1 is provided with a schematic illustration 2 of a dry-cleaning machine with the operative elements drawn in detail (e.g. tank I,II,III,IV, distillation, level I, level II, additive 1, spray, reversal, heater 1, heater 2, filter 1, filter 2) indicated by first green warning lights 3 and red warning lights 4 to indicate respectively operation or alarm conditions.

A series of second warning lights 5 is furthermore provided which correspond to various steps of the washing cycles (e.g. washing, load wetting, pre-washing, spin-drying, rolling, drying, deodorization).

A group of four numeric digital indicators 6 is also provided on the panel 1 and is coordinated with third warning lights 7 which specify the indications displayed (e.g. program, execution, filter, adjustment, test) and are operatively connected to a group of buttons 8 (e.g. +, −, tank level, filter, time, startup, inflow, second function) the last three whereof have respective pilot lights, it being possible by means of said indicators to set the values of said indications for the wash to be performed.

FIG. 2 shows a schematic block diagram of the control elements interfacing the panel 1 to the dry-cleaning machine operative elements.

A central processing unit 18 is connected to the panel 1, the memories 9, 10 and to an interface, or I/O controller 11 by means of a bus 12.

The interface 11 has an output 13 controlling a power device 14 which actuates drivers of the various elements of the dry-cleaning machine such as motors, valves, etc..

An input 15 of the interface 11 receives monitoring information from sensors (such as overload protectors, level switches etc.) connected to selected elements of the machine.

A manual by-pass 19 is provided between the power device 14 and the drivers to operate the machine manually if wanted.

Conveniently the CPU 18 and the memories, ROM 9 and RAM 10 are comprised in a single CPU card 16 connected to an I/O card 17 comprising the interface 11 and the power device 14. This arrangement makes it easy to adapt the panel 1 to different machines or, within a same machine, to provide different washing programs by simply substituting, for example, the CPU card.

The panel according to the invention allows to monitor the machine during the execution of the washing cycles and during the setup of the machine for a wash, and to modify and set selectively the operating parameters according to the type or step of the wash one intends to perform, without any need for the operator to have an exhaustive knowledge of the operation of the machine.

It has thus been observed that the invention achieves the intended aims.

The invention thus conceived is susceptible to numerous modifications and variations, all of which are within the scope of the inventive concept.

Moreover, all the details may be replaced with other technically equivalent ones.

In practice, the materials employed, as well as the shapes and the dimensions, may be any according to the requirements, without thereby abandoning the scope of the protection of the following claims.

I claim:

1. Programming and control panel for a dry-cleaning machine comprising:
   a schematic illustration showing the operative elements of the dry-cleaning machine,
   first warning lights each related to a step of the washing cycle of the dry-cleaning machine,
   second warning lights indicating the elements in operating condition during each step,
   third warning lights indicating alarm condition of said elements,
   a plurality of buttons to select every single step of the washing cycle and to adjust the operating condition of the elements intervening during said step,
   a digital display to visualize the performed adjustments and the operative condition of the elements intervening during the selected step.

* * * * *